United States Patent [19]
Schmischke et al.

[11] Patent Number: 6,078,863
[45] Date of Patent: Jun. 20, 2000

[54] METHOD OF PREPARING ROUTE GUIDE INFORMATION FOR THE DRIVER OF A VEHICLE

[75] Inventors: Kai Schmischke, Neuberg; Gerald Helmstädter, Weiterstadt, both of Germany

[73] Assignee: Mannesmann VDO AG, Frankfurt, Germany

[21] Appl. No.: 08/855,738

[22] Filed: May 9, 1997

[30] Foreign Application Priority Data

Jun. 5, 1996 [DE] Germany ............................ 196 22 527

[51] Int. Cl.⁷ .............................................. G08G 1/0969
[52] U.S. Cl. ........................... 701/209; 701/210; 340/995
[58] Field of Search ..................................... 701/201, 202, 701/205, 207, 208, 209, 210, 204; 340/990, 995

[56] References Cited

U.S. PATENT DOCUMENTS

| | | | |
|---|---|---|---|
| 5,243,528 | 9/1993 | Lefebvre | 701/211 |
| 5,293,163 | 3/1994 | Kakihara et al. | 340/995 |
| 5,402,120 | 3/1995 | Fujii et al. | 701/209 |
| 5,410,486 | 4/1995 | Kishi et al. | 701/211 |
| 5,430,655 | 7/1995 | Adachi | 701/209 |
| 5,739,772 | 4/1998 | Nanba et al. | 340/990 |
| 5,809,447 | 9/1998 | Kato et al. | 701/211 |
| 5,850,618 | 12/1998 | Suetsugu et al. | 701/210 |

OTHER PUBLICATIONS

Automotive Engineering, vol. 104, No. 5, May 1, 1996, pp. 71–75, "Intelligent Navigation Systems" Illustration 2.

IEEE Spectrum, vol. 32, No. 3, Mar. 1, 1995, pp. 37–41, 44–48, "The Electronic Motorist" p. 39, right column.

Proceedings of the Vehicle Navigation and Information Systems Conference, (VNIS), Toronto, Sep. 11–13, 1989, No. Conf. 1, 11, Reekie D; Case E; Tsai J, pp. A09–A14.

Zavoli W B: "Navigation and Digital Maps Interface for Fleet Management and Driver Information Systems" IEEE Sep. 1989.

*Primary Examiner*—Tan Nguyen
*Attorney, Agent, or Firm*—Martin A. Farber

[57] ABSTRACT

In method for preparing the driver of a vehicle for route guide information which is to be given in the form of indications for turning at route turn points, in which connection a route leading over route turn points to a destination is determined by means of stored street map, by which this route is provided to the driver of the vehicle as the correct route. The route is checked by means of the stored street map upon approach to a route turn point at which the driver is to turn off from the street on which he is traveling. This feature is provided whether one or more cross streets, which are at a shorter distance from the route turn point or from each other than a predetermined distance, lie on the same side of the street being driven on as the predetermined turn in front of the route turn point. If so, then all cross streets which lie between the vehicle and the route turn point at the time of the transmitting of the route turn information to the driver are included in the route turn information.

5 Claims, 1 Drawing Sheet

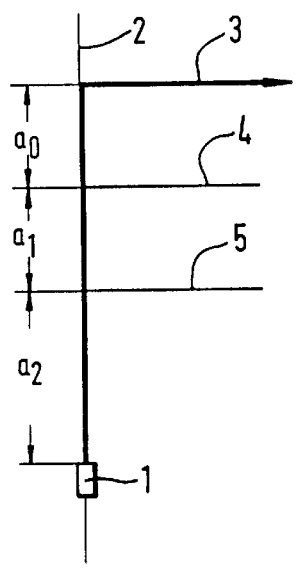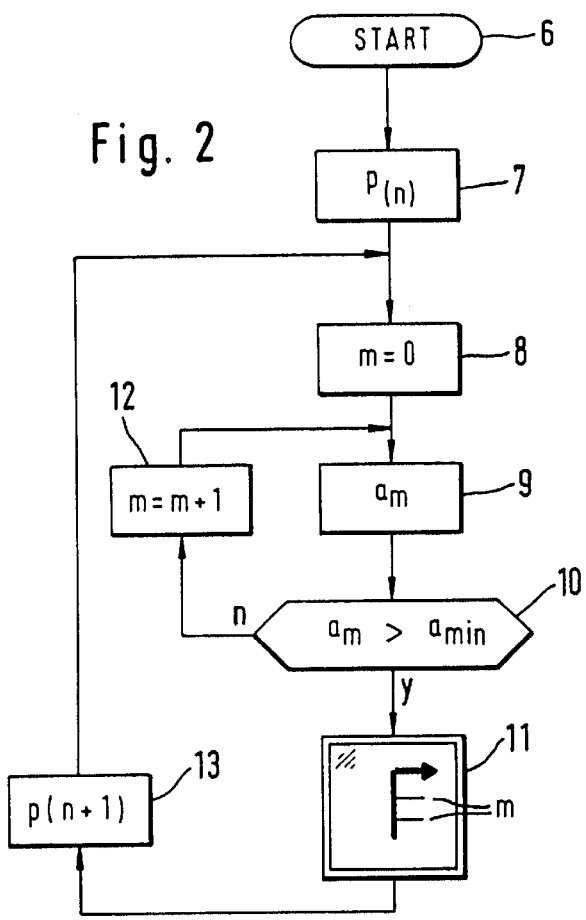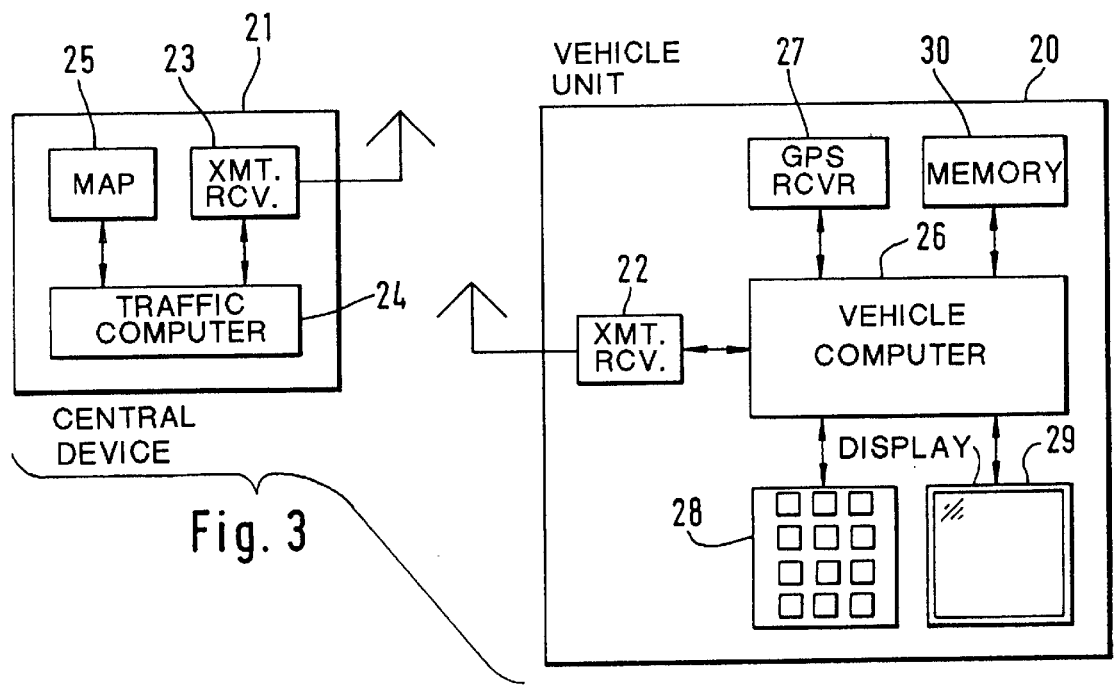

6,078,863

METHOD OF PREPARING ROUTE GUIDE INFORMATION FOR THE DRIVER OF A VEHICLE

FIELD AND BACKGROUND OF THE INVENTION

The present invention relates to a method of preparing, for the driver of a vehicle, route guide information which is to be given in the form of instructions for turning the vehicle at various points along the route, the method employing a stored street map, wherein a route leading over guide points to a destination is established for the driver of the vehicle as the intended route.

Various methods and devices have become known for the guiding of a motor vehicle to its destination. In this connection, after the determination of the desired route to be taken, route guide information is transmitted during vehicular travel to the driver of the vehicle. This may involve, for instance, a change in direction (turn) at a coming intersection or junction being indicated on a display device (display). In addition to or instead of an optical display, a spoken command can also be provided, for instance in the form "turn right" or "turn left".

In order that an associating of the display or vocal command with the corresponding route guide point is possible, the display is presented at a point in time corresponding to a predetermined distance before the route turn point, for instance 200 meters. This distance is determined by a comparison between the position of the route turn point and the position of the vehicle as determined in each case by a location detector. The determination of the position in the past, however, has been subject to tolerances of, for instance, 100 meters so that in the case of a relatively late display the driver will possibly no longer be able to react and in the case of too early a display the driver may turn into a cross street before the route turn point.

SUMMARY OF THE INVENTION

It is an object of the invention to give the driver of a vehicle clear turning instructions even when the cross streets follow each other closely.

According to the invention, when a route turn point at which the driver is to turn off from the street on which he traveling is approached, there is a checking by means of the stored street map whether one or more cross streets are present on the same side in front of the route turn point at a shorter distance away from the route turn point or from each other. If so, all the streets lying on the same side which are present between the vehicle and the route turn point at the time that the route turn information is given to the driver are included in the route turn information.

The method of the invention makes it possible in simple manner to give clear turning instructions even if cross streets are closer together than the tolerance range of the location indicating device in front of the street into which the vehicle is to be turned (in the following also referred to as the destination street). Furthermore, the method of the invention makes an early giving of the instruction possible, so that the driver can prepare in due time for a change in direction. After the transmitting of the information, it is left to the driver to turn into the "correct" street.

It is preferably provided in the method of the invention that the predetermined distance corresponds to the tolerance range of a position location system which determines the instantaneous position of the vehicle.

One advantageous embodiment of the method of the invention provides that a checking of the corresponding distance from the vehicle commences with the first cross street in front of the route turn point, and is repeated with further cross streets until a cross street is at a greater distance from the adjacent, previously checked street than the predetermined distance, and that the number of cross streets which are a smaller distance from the vehicle is displayed.

The transmitting of the route guide information to the driver of the vehicle can be effected in various ways in accordance with the method of the invention. One advantageous embodiment of the method of the invention provides that the transmitting of the route guide information is given by means of an optical display device having a turn arrow and further lines for the cross streets. However, the transmitting of the route guide information may also be given acoustically by a voice command.

BRIEF DESCRIPTION OF THE DRAWING

With the above and other objects and advantages in view, the present invention will become more clearly understood in connection with the detailed description of preferred embodiment, when considered with the accompanying drawing, of which:

FIG. 1 shows a portion of a street map, for explanation of the method of the invention;

FIG. 2 is a flow chart; and

FIG. 3 shows an embodiment of a device for the carrying out of the method of the invention.

DETAILED DESCRIPTION OF THE PREFERRED EMBODIMENT

With reference to FIG. 1, a vehicle 1 is traveling on a street 2 and approaches a route turn point P(n), shown FIG. 2. The intended route turns here into a destination street 3, and this is to be indicated to the driver. At a distance $a_0$ in front of the destination street 3, a street 4 branches off to the right from the street 2. Another street 5 also is present on the right, at a distance $a_1$, from and before street 4. The car 1 is at a distance $a_2$ in front of street 5. Since the distance between the car 1 and the route turn point P(n) can be determined only with a rough tolerance as compared with the distances between the cross streets shown, it is not possible, solely on basis of the determination of the position, to give the correct instruction for turning—in the present case "turn right at the third street".

With the method of the invention shown in FIG. 2, the route turn point P(n) is first of all selected at 7 after the start at 6, and the index m at 8 is set to zero. In program part 9, it is inquired how great the distance $a_m$ is between the designation street 2 and the immediately preceding cross street 4 or between the further cross streets. At 10, the distance $a_m$ is compared with a minimum distance $a_{min}$. As long as $a_m$ is not greater than $a_{min}$, m is incremented at 12 and the distance to the next cross street is checked in the program parts 9 and 10.

However, if $a_m$ is greater than the minimum distance, then it can be assumed that no further cross streets are present between the vehicle 1 and the route turn point P(n). The number m transmitted to a program part 11 in which a right-turn arrow, together with the corresponding number of cross streets ahead is produced and shown in the display. The next route turn point P(n+1) is then determined at 13, whereupon the program is repeated.

The embodiment of a device in accordance with the invention which is shown in the block diagram of FIG. 3, consists of a vehicle unit 20 and a central device 21, a radio connection being established between them by, in each case, a transmitter/receiver (transceiver) 22, 23, for instance in accordance with the GSM standard. In the central device 21 there is a traffic control computer 24 which has access to a stored street map 25 and effects a determination of the route for many vehicles.

The vehicle unit 20 consists essentially of a car computer 26, a GPS (Global Positioning System) receiver 27, an input device 28, a display device 29, and a memory 30. These components are known per se and need not be further explained for an understanding of the invention. The GPS receiver 27 provides the car computer 26 continuously with information as to the geographical position of the vehicle. The driver of the vehicle can enter a destination by means of the input device 28. This destination is fed, together with the present position of the vehicle, to the traffic control computer 24 which determines the correct route on basis of the street map 25 and transmits it, in the form of a list of route turn points, to the vehicle unit 20. For the carrying out of the method of the invention, the traffic control computer 24 furthermore calculates for the individual route turn points, distances to cross streets which lie in front of the route turn points, which distances are also transmitted to the vehicle unit 20.

As a result of the position reports of the GPS receiver 27, the car computer 26 is advised as to what extent route turn points are reached so that the display device 29 displays the route turn information for the next route-turn point.

We claim:

1. A method of preparing, for the driver of a vehicle, route guide information which is to be given in the form of instructions for turning at points along the route, comprising steps of:

storing a street map;

determining by means of the street map, a route leading over route guide points to a destination established as an intended route for the driver of the vehicle;

providing the value of a predetermined distance;

establishing a condition for displaying cross streets, such that, when a route turn point at which the driver is to turn off from the street being traveled is approached, checking, a criterion that the distance to the route point is greater than said predetermined distance;

upon fulfilment of said criterion, checking by means of the street map, whether one or more cross streets are present on the same side of the traveled street within said predetermined distance in front of the route turn point; and wherein, upon fulfilment of said condition that one or more cross streets are present on the same side of the traveled street within the predetermined distance, presenting all the streets lying on the same side of the traveled street which are present between the vehicle and the route turn point at the time of a giving of the route turn information to the driver.

2. A method according to claim 1, wherein in said presenting step, there is a displaying of the route guide information by means of an optical display device having a turn arrow and lines for the cross streets.

3. A method according to claim 1, wherein in said presenting step, there is a transmitting of the route guide information acoustically by a voice command.

4. A method of preparing, for the driver of a vehicle, route guide information which is to be given in the form of instructions for turning at points along the route, comprising steps of:

storing a street map;

determining by means of the street map, a route leading over route guide points to a destination established as an intended route for the driver of the vehicle; and establishing a condition for displaying cross streets, such that, when a route turn point at which the driver is to turn off from the street being traveled is approached, checking, by means of the street map, whether one or more cross streets are present on the same side of the traveled street in front of the route turn point at a distance shorter from the route turn point than the vehicular distance to the turn point, or separated from each other by a distance shorter than said vehicular distance;

wherein, upon fulfillment of said condition, presenting all the streets lying on the same side of the traveled street which are present between the vehicle and the route turn point at the time of a giving of the route turn information to the driver;

the steps of the method are implemented by use of a position location system which determines the instantaneous position of the vehicle, the system being characterized by a tolerance range for spacing between streets; and wherein said presenting step, information is provided to the driver at the predetermined distance before the route turn point, the predetermined distance being equal to or greater than the tolerance range.

5. A method according to claim 4, wherein, in said presenting step, there is a checking of the distance from the vehicle to the route turn point, the checking commencing with the first cross street in front of the route turn point and being repeated with further cross streets until a cross street is at a greater distance from an adjacent, previously checked cross street than the predetermined distance; and displaying cross streets which are a smaller distance than the predetermined distance.

* * * * *